United States Patent
Alikhani

(10) Patent No.: US 9,328,846 B2
(45) Date of Patent: May 3, 2016

(54) SHUT-OFF TRIM INCLUDING SPRING LOADED CHECK VALVE

(71) Applicant: CONTROL COMPONENTS, INC., Rancho Santa Margarita, CA (US)

(72) Inventor: Sina Alikhani, Laguna Hills, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 118 days.

(21) Appl. No.: 14/157,428

(22) Filed: Jan. 16, 2014

(65) Prior Publication Data

US 2014/0174576 A1    Jun. 26, 2014

Related U.S. Application Data

(62) Division of application No. 13/157,675, filed on Jun. 10, 2011, now Pat. No. 8,662,110.

(60) Provisional application No. 61/353,589, filed on Jun. 10, 2010.

(51) Int. Cl.
   *F16K 3/26* (2006.01)
   *F16K 39/02* (2006.01)

(52) U.S. Cl.
   CPC .............. *F16K 39/024* (2013.01); *F16K 3/267* (2013.01); *Y10T 137/7765* (2015.04); *Y10T 137/7771* (2015.04); *Y10T 137/86734* (2015.04); *Y10T 137/86968* (2015.04); *Y10T 137/88054* (2015.04)

(58) Field of Classification Search
   CPC .................. F16K 39/024; F16K 3/267; Y10T 137/88054; Y10T 137/7771; Y10T 137/7765; Y10T 137/86734; Y10T 137/86968
   See application file for complete search history.

(56) References Cited

U.S. PATENT DOCUMENTS

| | | | |
|---|---|---|---|
| 1,870,293 A | 8/1932 | Miller | |
| 2,376,124 A | 5/1945 | Coulbourn | |
| 3,589,397 A | 6/1971 | Wagner | |
| 3,623,509 A | 11/1971 | Sesseler et al. | |
| 3,624,753 A * | 11/1971 | Brumm | F16K 39/024 137/630.14 |
| 3,888,280 A | 6/1975 | Tartaglia | |
| 4,699,351 A * | 10/1987 | Wells | F16K 31/408 251/29 |
| 4,928,733 A | 5/1990 | Sudolnik et al. | |
| 5,271,599 A * | 12/1993 | Kolchinsky | F16K 31/408 251/30.01 |
| 5,848,608 A | 12/1998 | Ishigaki | |
| 8,662,110 B2 * | 3/2014 | Alikhani | F16K 39/024 137/614.2 |

FOREIGN PATENT DOCUMENTS

DE    29912814    12/1999

OTHER PUBLICATIONS

European Patent Office, European Search Report, Apr. 3, 2014, 6 Pages, Munich Germany.

* cited by examiner

*Primary Examiner* — Eric Keasel
(74) *Attorney, Agent, or Firm* — Stetina Brunda Garred & Brucker

(57) ABSTRACT

In accordance with the present invention, there is provided a bi-directional shut-off trim for a valve which possesses the functional attributes of a pilot operated trim and a balanced trim through the integration of a spring loaded check valve into a pilot trim. In forward flow isolation, the bi-directional shut-off trim of the present invention acts as a normal pilot operated trim. In reverse flow, the check valve of the shut-off trim opens to balance the pressure on either side of the plug thereof.

8 Claims, 6 Drawing Sheets

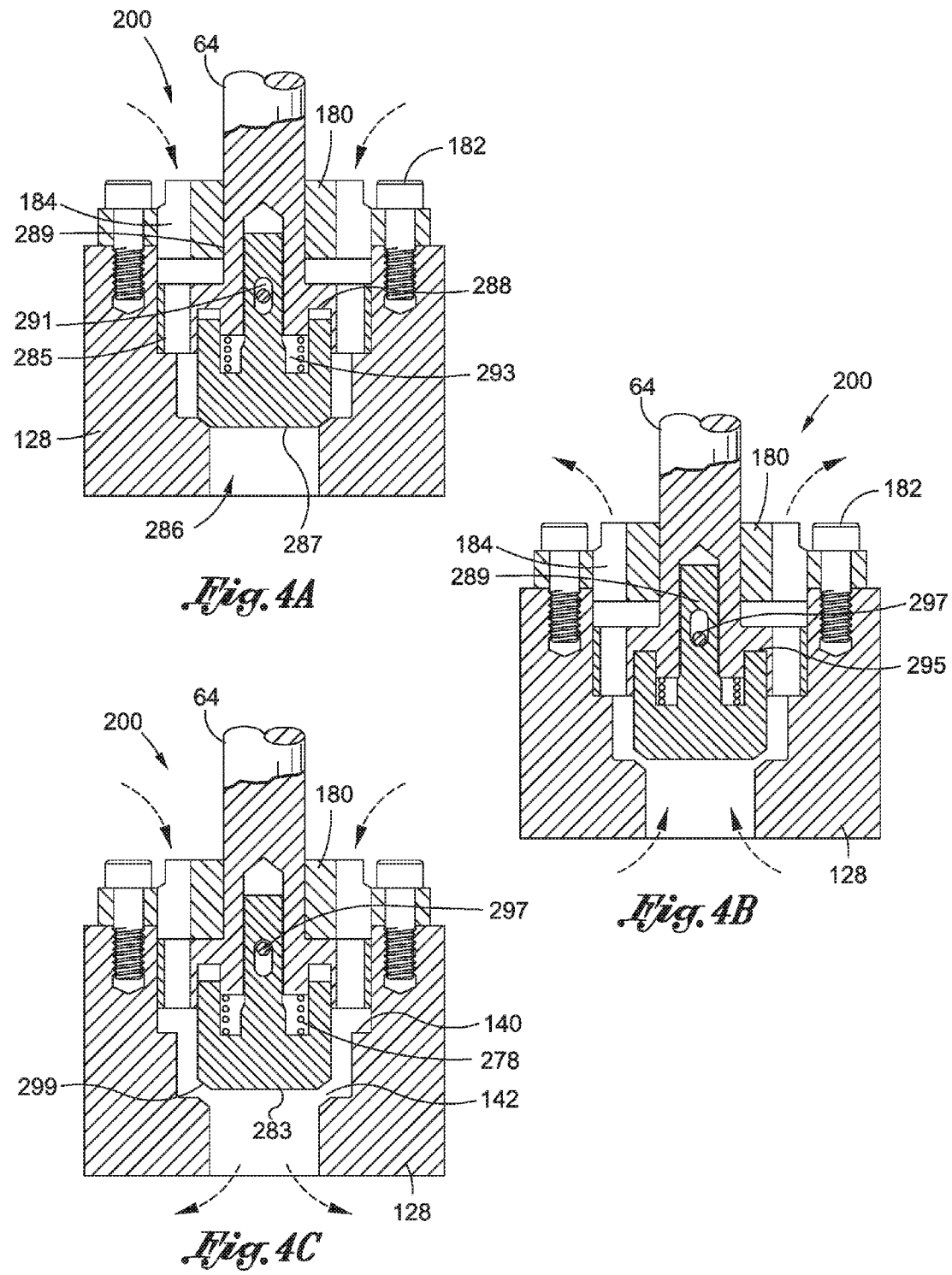

SHUT-OFF TRIM INCLUDING SPRING LOADED CHECK VALVE

CROSS-REFERENCE TO RELATED APPLICATIONS

The present application is a divisional of U.S. application Ser. No. 13/157,675 entitled SHUT-OFF TRIM INCLUDING SPRING LOADED CHECK VALVE filed Jun. 10, 2011, which claims priority to U.S. Provisional Patent Application Ser. No. 61/353,589 entitled SHUT-OFF TRIM INCLUDING SPRING LOADED CHECK VALVE filed Jun. 10, 2010.

STATEMENT RE: FEDERALLY SPONSORED RESEARCH/DEVELOPMENT

Not Applicable

BACKGROUND OF THE INVENTION

1. Technical Field of the Invention

The present invention relates generally to bi-directional valves for high pressure fluid flow and, more particularly, to a bi-directional shut-off trim for a valve which possesses the functional attributes of a pilot operated trim and a balanced trim through the integration of a spring loaded check valve into a pilot trim. In forward flow isolation, the bi-directional shut-off trim of the present invention acts as a normal pilot operated trim. In reverse flow, the check valve of the shut-off trim opens to balance the pressure on either side of the plug thereof.

2. Description of the Related Art

There is known in the prior art valve constructions which are adapted to provide pressure balance on opposite sides of a main valve assembly during both opening and closing movements of the main valve assembly with fluid flow in either direction through the valve. One such exemplary prior art bi-directional balanced valve is disclosed in U.S. Pat. No. 3,888,280 entitled BI-DIRECTIONAL PRESSURE BALANCED VALVE issued Jun. 10, 1975.

However, currently known valve constructions or designs providing a bi-directional pressure balanced function are often subject to early failure and malfunctioning when used under severe service conditions, e.g., under high temperature and high pressure operating conditions. More particularly, the failure or malfunctioning of currently known valve designs is often attributable to the rapid erosion of deterioration of their sealing areas, as well as other critical valve components. In this regard, the available seal materials usable in conjunction with currently known bi-directional pressure balanced valve designs are often not adequate for providing required shut-off characteristics, and further frequently make the valve susceptible to early failure when the such seal materials are subjected or exposed to the intended operational environment of the valve.

The present invention is intended to represent an improvement to existing bi-directional pressure balanced valve designs by providing a valve shut-off trim which combines a pilot operated trim and a balanced trim through the addition of a spring loaded check valve within the pilot trim. As indicated above, in forward flow isolation, the shut-off trim of the present invention acts as a normal pilot operated trim, while in reverse flow, the check valve thereof opens to balance the pressure on either side of the plug of the trim. Thus, the addition of the spring loaded check valve in the shut-off trim of the present invention causes the pilot operated trim to act as a balanced plug in the reverse flow direction. These, as well as other features and advantages of the present invention, will be described in more detail below.

BRIEF SUMMARY OF THE INVENTION

In accordance with the present invention, there is provided a valve shut-off trim which includes a spring loaded check valve and is usable in applications requiring valves with bi-directional shut-off trim where the use of unbalanced trim designs is not feasible and the choice of seals is limited by temperature, and/or radiation, and/or chemistry of seal materials. The shut-off trim constructed in accordance with the present invention finds particular utility in applications requiring shut-off in a forward direction of Class V and shut-off in a reverse flow direction of Class IV, with forward flow being, for example, water at 440° F. and reverse flow being, for example, steam at 567° F.

In the present invention, to obtain Class IV shut-off in a reverse flow direction, carbon piston rings are integrated into the shut-off trim. By combining a pilot ported plug and a check valve (which allows flow in the reverse direction), the shut-off trim of the present invention allows isolation in forward and reverse directions. In the forward direction, the trim achieves leak-tight shut-off (pilot ported plug acts an unbalanced plug when in the closed position). In the reverse direction and during modulation, the shut-off trim acts as a balanced plug. Thus, when reverse pressure unseats the pilot plug, the trim acts a balanced plug as indicated above. The shut-off trim of the present invention preferably includes a spring for loading the pilot plug.

Due to its construction, which will be described with particularity below, the shut-off trim constructed in accordance with the present invention eliminates reliance on elastomeric balance seals for the forward flow direction, and allows for the use of, by way of example, carbon or metallic piston rings for the reverse direction shut-off requirements. Thus, the shut-off trim of the present invention eliminates the need for a lengthy seal qualification program and extends the qualified life of the equipment in the field with integrates the same. As a result, the shut-off trim constructed in accordance with the present invention has the capability of satisfying safety related isolation functions that have been imposed on control valves integrated or used in certain applications, such as those requiring the aforementioned Class V shut-off in a forward direction and a Class IV shut-off in a reverse direction. In many of these applications, the use of graphoil seals would not be suitable due to the number of open/close/small modulation cycles that are imposed by the application requirements. Additionally, elastomeric seals are generally unsuitable for obtaining Class V shut-off since this requirement often pushes such elastomeric seals to or beyond their documented usable limits, or undesirably shortens their qualified life due to, for example, the limited ability thereof to withstand radiation, as well as their susceptibility to hardening due to thermal aging.

The present invention is best understood in reference to the following detailed description when read in conjunction with accompanying drawings.

BRIEF DESCRIPTION OF THE DRAWINGS

These, as well as other features of the present invention, will become more apparent upon reference to the drawings wherein:

FIGS. 4A-4C are side-elevational views illustrating an auxiliary plug in differing states of actuation which may be used as an alternative to the plug sleeve shown in FIGS. 2 and 3A-3D in a shut-off trim constructed in accordance with a third embodiment of the present invention;

Common reference numerals are used throughout the drawings and detailed description to indicate like elements.

DETAILED DESCRIPTION OF THE INVENTION

Figure 1:
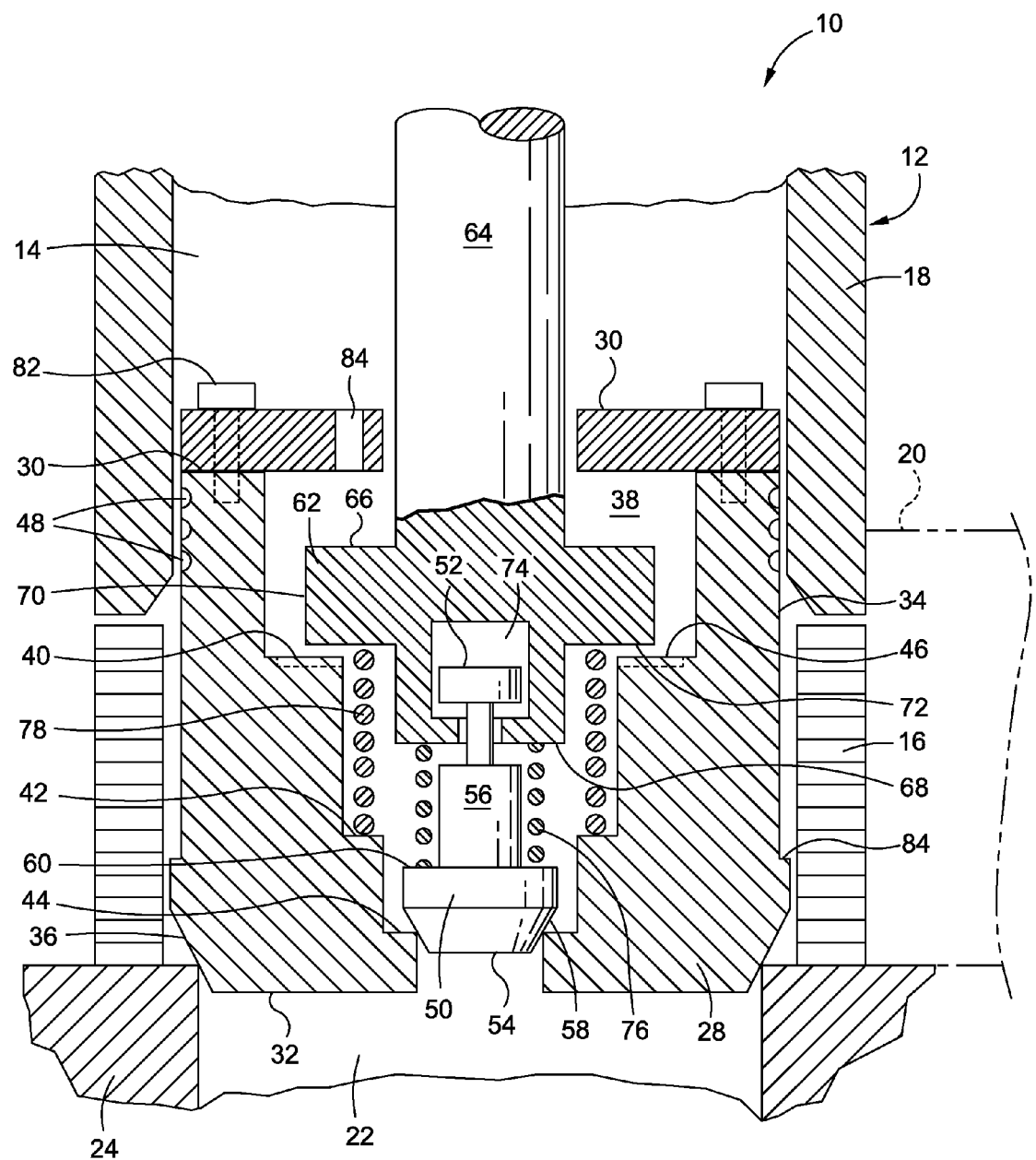
FIG. 1 is a side-elevational, partial cross-sectional view of a shut-off trim constructed in accordance with a first embodiment of the present invention.

Referring now to the drawings wherein the showings are for purposes of illustrating preferred embodiments of the present invention only, and not for purposes of limiting the same, FIG. 1 depicts a shut-off trim 10 constructed in accordance with a first embodiment of the present invention. It is contemplated that the trim 10 will be integrated into a valve construction wherein the valve includes a housing which defines an interior plug chamber 14. The plug chamber 14 is partially defined by a generally cylindrical, tubular fluid energy dissipation device, such as the disc stack 16 shown in FIG. 1. The plug chamber 14 is further partially defined by a generally cylindrical, tubular plug sleeve 18 which is coaxially aligned with the disc stack 16, one end of the plug sleeve 18 typically being engaged to a corresponding end of the disc stack 16.

In addition to the plug chamber 14, the housing 12 of the valve into which the trim 10 is integrated also defines an inflow passage 20 and an outflow passage 22 which each fluidly communicate with the plug chamber 14. The inflow and outflow passages 20, 22 are more easily seen in those embodiments of the shut-off trim depicted in FIGS. 2 and 5. In the valve including the trim 10, fluid traveling through the inflow passage 20 flows radially inwardly through the disc stack 16 and into the plug chamber 14. When the trim 10 is in an open condition or state as will be described in more detail below, fluid entering the plug chamber 14 is able to flow into the outflow passage 22, and thereafter exit the valve including the trim 10. Typically, the interface between the outflow passage 22 and the plug chamber 14 is defined by an annular seat ring 24.

The trim 10 constructed in accordance with the first embodiment of the present invention comprises a main pilot plug 28 which, from the perspective shown in FIG. 1, defines a top surface 30, a bottom surface 32, a side surface 34, and a beveled sealing surface 36 which extends between the bottom and side surfaces 32, 34. The pilot plug 28 is not solid, but rather has a bore 38 extending axially therethrough. As is also apparent from FIG. 1, the bore 38 is not of uniform diameter. Rather, the bore 38 defines four (4) different segments or sections, each of which is of a differing diameter. More particularly, the diameters of the bore sections defined by the bore 38 progressively decrease from the top surface 30 to the bottom surface 32, with the lowermost bore section extending to the bottom surface 32 thus being of the smallest diameter of the four bore sections. The uppermost and upper middle bore sections are separated from each other by an annular shoulder 40. Similarly, the upper middle and lower middle bore sections are separated by an annular shoulder 42, with the lower middle and lowermost bore sections being separated by an annular shoulder 44. Disposed within the shoulder 40 is a plurality of elongate grooves or channels 46, the use of which will be described in more detail below. Additionally, disposed in the side surface 34 of that portion of the pilot plug 28 which defines the uppermost bore section is a plurality of sealing rings 48 which circumvent the pilot plug 28 and are used for reasons which will also be described in more detail below.

When the trim 10 is in a closed position within the exemplary valve including the same, the sealing surface 36 defined by the pilot plug 28 is firmly seated and sealed against the seat ring 24. The trim 10 assumes an open position when, from the perspective shown in FIG. 1, the pilot plug 28 is caused to move upwardly as results in the sealing surface 36 thereof effectively being separated from the seat ring 24. Such separation allows fluid within the plug chamber 14 to flow between the sealing surface 36 and seat ring 24 into the outflow passage 22.

In addition to the pilot plug 28, the trim 10 includes check valve assembly comprising an auxiliary plug 50 which resides within the bore 38 of the pilot plug 28. Like the pilot plug 28, the auxiliary plug 50, when viewed from the perspective shown in FIG. 1, defines a top surface 52, a bottom surface 54, a side surface 56, and a beveled sealing surface 58 which extends between the bottom and side surfaces 54, 56. As is apparent from FIG. 1, the side surface 56 of the auxiliary plug 50 is not of uniform outer diameter. Rather, the side surface 56 defines four (4) side surface sections or segments which may be of differing outer diameter. Along these lines, it is contemplated that the outer diameter of the lowermost segment of the side surface 56 to which the sealing surface 58 extends will be of the greatest diameter in the auxiliary plug 50. In the auxiliary plug 50, the lowermost and lower middle segments of the side surface 56 are separated by an annular shoulder 60.

In the trim 10, the auxiliary plug 50 is operatively coupled to a collar 62 of the check valve assembly which is attached to the bottom end of the stem 64 of the valve including the trim 10. When viewed from the perspective shown in FIG. 1, the collar 62 defines a top surface 66, a bottom surface 68, and a side surface 70. The side surface 70 is also not of uniform outer diameter, but rather includes two (2) side surface sections or segments which are of differing outer diameter. In this regard, that segment of the side surface 70 extending to the top surface 66 exceeds the outer diameter of that segment of the side surface 70 extending to the bottom surface 68. These upper and lower segments of the side surface 70 are separated by an annular shoulder 72.

In the trim 10, the auxiliary plug 50 is moveably attached to the collar 62 via the receipt of a portion of the auxiliary plug 50 into a complimentary interior cavity 74 defined by the collar 62. As seen in FIG. 1, that portion of the auxiliary plug 50 defining the uppermost segment of the side surface 56 thereof is captured and maintained within the interior cavity 74, as is at least a portion of the auxiliary plug 50 which defines the upper middle segment of the side surface 56 thereof. The cooperative engagement between the auxiliary plug 50 and the collar 62 allows for the reciprocal movement of the auxiliary plug 50 relative to the collar 62 in a manner either decreasing or increasing the distance separating the shoulder 60 of the auxiliary plug 50 from the bottom surface 68 of the collar 62. In this regard, the check valve assembly of the trim 10 preferably includes a biasing spring 76 which extends between the shoulder 60 and the bottom surface 68. The biasing spring 76 normally biases the auxiliary plug 50 away from the collar 62, i.e., maximizes the distance separating the shoulder 60 of the auxiliary plug 50 from the bottom surface 68 of the collar 62. As will be recognized, the movement of the auxiliary plug 50 away from the collar 62 attributable to the action of the biasing spring 76 is eventually limited by the abutment of that portion of the auxiliary plug 50 defining the uppermost segment of the side surface 56 against an inner surface portion of the collar 62 which partially defines the interior cavity 74 thereof.

As indicated above, the pilot plug 28 of the trim 10 is moveable between a closed position wherein the sealing surface 36 thereof is sealed against the seat ring 24, and an open position wherein the sealing surface 36 of the pilot plug 28 is separated from the seat ring 24, thus allowing fluid to flow therebetween into the outflow passage 22. The movement of the pilot plug 28 between its closed and open positions is facilitated by the upward and downward movement or actuation of the stem 64, and more particularly, the collar 62 attached to one end thereof. As will be recognized, the reciprocal movement of the stem 64 and collar 62 as is needed to facilitate the movement of the pilot plug 28 between its closed and open positions is facilitated by an actuator which is operatively coupled to that end of the stem 64 opposite that having the collar 62 attached thereto. The downward movement of the stem 64 when viewed from the perspective shown in FIG. 1 causes the shoulder 72 defined by the collar 62 to act against the shoulder 40 of the pilot plug 28 in a manner which forces the sealing surface 36 of the pilot plug 28 against the seat ring 24 and maintains the sealed engagement therebetween.

When the pilot plug 28 is in its closed position, the biasing force exerted against the auxiliary plug 50 by the biasing spring 76 causes the sealing surface 58 of the auxiliary plug 50 to firmly engage and establish sealed contact with a portion of the pilot plug 28 at the inner periphery of the shoulder 44 thereof, as shown in FIG. 1. As is further shown in FIG. 1, in the check valve assembly integrated into the trim 10, a biasing spring 78 extends between the shoulder 42 of the pilot plug 28 and the shoulder 72 of the collar 62. From the perspective shown in FIG. 1, when the stem 64 is actuated to facilitate the movement of the pilot plug 28 to the closed position, the downward biasing force exerted against the pilot plug 28 by the biasing spring 78 assists in maintaining the sealed engagement between the sealing surface 36 of the pilot plug 28 and the seat ring 24 even if the shoulder 72 of the collar 62 ceases to apply force directly to the shoulder 40 of the pilot plug 28.

When the trim 10 is in a state or condition wherein the sealing surface 36 of the pilot plug 28 is sealed against the seat ring 24 and the sealing surface 58 of the auxiliary plug 50 is sealed against the pilot plug 28, the pressure level $P_1$ in the inflow passage 20 will typically exceeds the pressure level $P_2$ in the outflow passage 22. The pressure level $P_1$ also exists in the plug chamber 14. In this regard, when viewed from the perspective shown in FIG. 1, the plug chamber 14 is at the pressure level $P_1$ both above and below the level of a plug plate 80 which is attached to the top surface 30 of the pilot plug 28 through the use of, for example, fasteners such as bolts 82. The plug plate 80, which is used for reasons described in more detail below, includes at least one flow opening 84 which extends between the opposed top and bottom surfaces thereof.

In the valve including the trim 10, that portion of the plug chamber 14 located above the plug plate 80 reaches the pressure level $P_1$ as a result of anticipated leakage which occurs between the inner surface of the plug sleeve 18 and the sealing rings 48 disposed in the side surface 34 of the pilot plug 28. In this regard, the sealing rings 48 facilitate the pressurization of that portion of the plug chamber 14 located above the plug plate 80 in a regulated, metered manner. As is also seen in FIG. 1, the side surface 34 of the pilot plug 28 is not of uniform outer diameter, but rather defines an annular shoulder 84 which is disposed in relative close proximity to the sealing surface 36. Advantageously, the fluid pressure at the pressure level $P_1$ within that portion of the plug chamber 14 below the plug plate 80 and in between the side surface 34 and the inner surfaces of the disc stack 16 and plug sleeve 18 is able to act against the shoulder 84 in a manner supplementing or increasing the force of the sealed engagement between the sealing surface 36 and seat ring 24. Such sealed engagement is further supplemented by the pressure level $P_1$ within that portion of the plug chamber 14 disposed below the plug plate 80 acting against the shoulders 40, 42, 44 of the pilot plug 28. In this regard, fluid migrating between the pilot plug 28 and plug sleeve 18 into that portion of the plug chamber 14 above the plug plate 80 is able to flow into the uppermost section of the bore 38 via the at least one flow opening 84 of the plug plate 80. Even if the shoulder 72 of the collar 62 is firmly seated against the shoulder 40 of the pilot plug 28, fluid is also able to flow into the upper middle and lower middle sections of the bore 38 via the channels 46 in the shoulder 40, at least portions of which extend radially beyond that segment of the side surface 70 of the collar 62 of greater diameter extending to the top surface 66 thereof. Such flow results in the upper middle and lower middle sections of the bore 38 reaching the fluid pressure level $P_1$ along with the uppermost section of the bore 38. Advantageously, the pressure level $P_1$ in the lower middle section of the bore 38 also acts against the shoulder 60 of the auxiliary plug 50 which supplements or enhances the sealed engagement between the sealing surface 58 of the auxiliary plug 50 and the pilot plug 28.

In the valve including the trim 10, the movement of the pilot plug 28 from its closed position to an open position is facilitated by the upward movement of the stem 64, and hence the collar 62, when viewed from the perspective shown in FIG. 1, such upward movement being facilitated by the actuator cooperatively engaged to the stem 64. The upward movement of the stem 64 initially causes the collar 62 to act against that portion of the auxiliary plug 50 residing within the interior cavity 74 as effectively removes the sealing surface 58 from its sealed engagement to the pilot plug 28. The movement of the auxiliary plug 50 out of sealed engagement with the pilot plug 28 creates a balanced pressure condition between the plug chamber 14 and the outflow passage 22. In this regard, the removal of the auxiliary plug 50 from its sealed engagement to the pilot plug 28 allows for open flow between the plug chamber 14 (including that portion disposed above the plug plate 80) and the outflow passage 22 via the bore 38 and flow passage 84 of the plug plate 80.

The continued upward movement of the collar 62 after the auxiliary plug 50 is unseated from the pilot plug 28 results in the top surface 66 of the collar 62 acting against the bottom surface of the plug plate 80. By virtue of the attachment of the plug plate 80 to the pilot plug 28, the continued upward movement of the collar 62 after the same engages the plug plate 80 results in the sealing surface 36 of the pilot plug 28 being lifted off of and thus separated from the seat ring 24, thereby causing the trim 10 to assume an open position.

In the trim 10 constructed in accordance with the present invention, it is contemplated that in a further mode of operation, a balanced pressure condition between the plug chamber 14 and outflow passage 22 may be achieved if the pilot plug 28 is in its closed position, but the pressure level $P_2$ in the outflow passage 22 exceeds the pressure level $P_1$ in the inflow passage 20 and plug chamber 14. In this instance, it is contemplated that the pressure level $P_2$ will act against the bottom surface 54 of the auxiliary plug 50 in a manner facilitating the compression of the biasing spring 76 and removal of the sealing surface 58 from its sealed engagement to the pilot plug 28. The upward movement of the auxiliary plug 50 by virtue of the compression of the biasing spring 76 is accommodated by the clearance between that portion of the auxiliary plug 50 residing within the interior cavity 74 and those surfaces of the collar 62 defining the interior cavity 74. Once the auxiliary plug 50 is unseated from the pilot plug 28, fluid is able to flow into the lower middle and upper middle sections of the bore 38, and thereafter into the uppermost section of the bore 38 via the channels 46 disposed in the shoulder 40. Fluid flowing into the uppermost section of the bore 38 is in turn able to flow into that portion of the plug chamber 14 disposed above the plug plate 80 via the flow opening 84 within the plug plate 80. The equalization of the pressure level in the plug chamber 14 with the pressure level in the outflow passage 22 results in the sealing surface 58 of the auxiliary plug 50 being returned to sealed engagement to the pilot plug 28 by operation of the biasing spring 76. Similarly, the sealed engagement between the sealing surface 36 of the pilot plug 28 and the seat ring 24 is maintained by the biasing spring 78.

The check valve assembly integrated into the trim 10 comprises the auxiliary plug 50, collar 62 and biasing springs 76, 78. Importantly, the functional attributes provided to the trim 10 by the check valve assembly allow the trim to achieve a Class V shut-off when subjected to an operational condition wherein the pressure level $P_1$ within the inflow passage 20 and plug chamber 14 exceeds the pressure level $P_2$ in the outflow passage 22. The unique structural and functional attributes of the trim 10 also allow the same to achieve a Class IV shut-off when subjected to an operational condition wherein the pressure level $P_2$ in the outflow passage 22 rises to the level which exceeds that of the pressure level $P_1$ in the inflow passage 20 and plug chamber 14.

Referring now to FIGS. 2 and 3A-3C, there is shown a shut-off trim 100 constructed in accordance with a second embodiment of the present invention. The trim 100 comprises a main pilot plug 128 which, from the perspective shown in FIG. 2, defines a top surface 130, a bottom surface 132, a side surface 134, and a sealing surface 136 which extends between the bottom and side surfaces 132, 134. The pilot plug 128 is not solid, but rather has a bore 138 extending axially therethrough. The bore 138 is not of uniform diameter. Rather, the bore 138 defines four (4) different segments or sections, each of which is of a differing diameter. More particularly, the bore 138 includes an uppermost section, an upper middle section, and a lower middle section which are of a progressively decreasing diameter. The bore 138 also defines a lowermost section which is of the greatest diameter, exceeding that of the uppermost section thereof. The uppermost and upper middle sections of the bore 138 are separated by a shoulder 140. Similarly, the upper middle and lower middle sections of the bore 138 are separated by an annular shoulder 142. Additionally, disposed in the side surface 134 of that portion of the pilot plug 128 which defines the uppermost bore section is a plurality of sealing rings 148 which circumvent the pilot plug 128 and are used for reasons which will also be described in more detail below.

When the trim 100 is in a closed position within the exemplary valve including the same, the sealing surface 136 defined by the pilot plug 128 is firmly seated and sealed against the seat ring 24. The trim 100 assumes an open position when, from the perspective shown in FIG. 2, the pilot plug 128 is caused to move upwardly as results in the sealing surface 136 thereof effectively being separated from the seat ring 24. Such separation allows fluid from within the plug chamber 14 to flow between the sealing surface 136 and seat ring 24 into outflow passage 22.

Figure 3A:
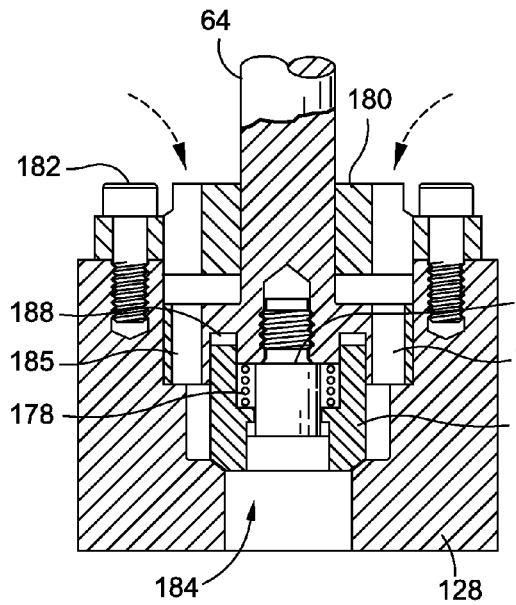
FIGS. 3A-3C are side-elevational views illustrating a plug sleeve of the shut-off trim shown in FIG. 2 in differing states of actuation.
Figure 3B:
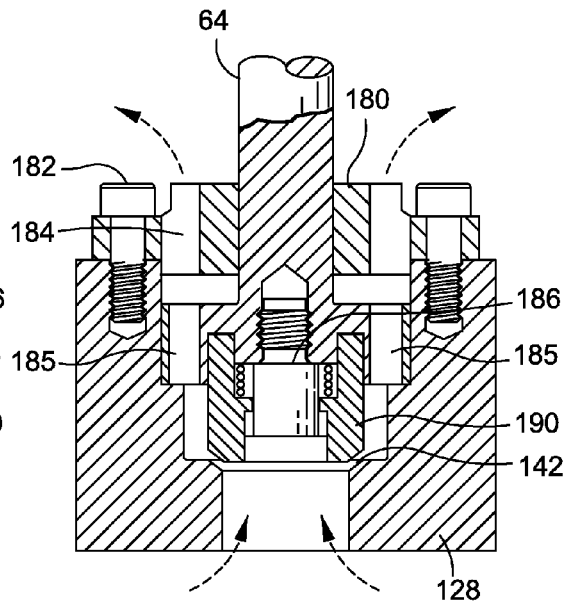
Figure 3C:
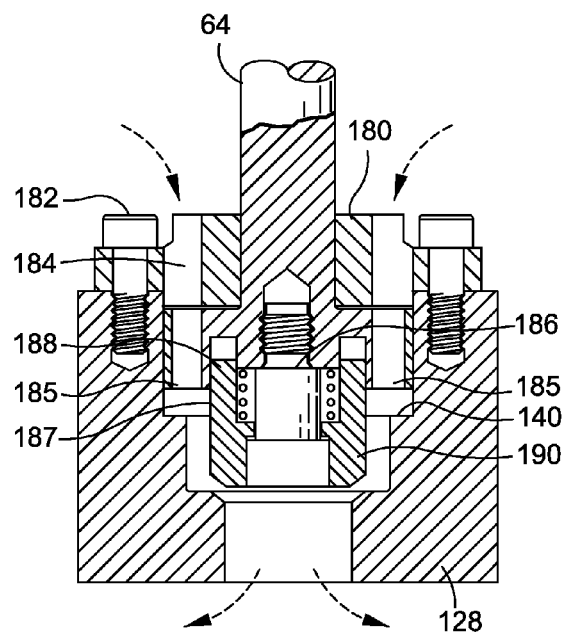

In addition to the pilot plug 128, the trim 100 includes a check valve assembly comprising a fastener 186 which is secured to that end of the stem 64 opposite the end portion cooperatively engaged to the actuator. As best seen in FIGS. 3A-3C, the fastener 186 comprises a cylindrically configured shank portion, an enlarged head portion which is formed on one end of the shank portion, and an externally threaded attachment portion which is threadably advanced into a complimentary, internally threaded aperture disposed within the end surface of the stem 64. As is also apparent from FIGS. 3A-3C, the end portion of the stem 64 defining the end surface having the internally threaded aperture formed therein is enlarged relative to the remainder of the stem 64. The end surface of the stem 64 which includes the internally threaded aperture therein also includes an annular groove or channel 188 which is formed therein and effectively circumvents the internally threaded aperture. The use of the channel 188 will be described in more detail below. The advancement of the attachment portion of the fastener 186 into the complimentary, internally threaded aperture of the stem 64 is continued until such time as the shank portion of the fastener 186 abuts the end surface of the stem 64.

Figure 3D:
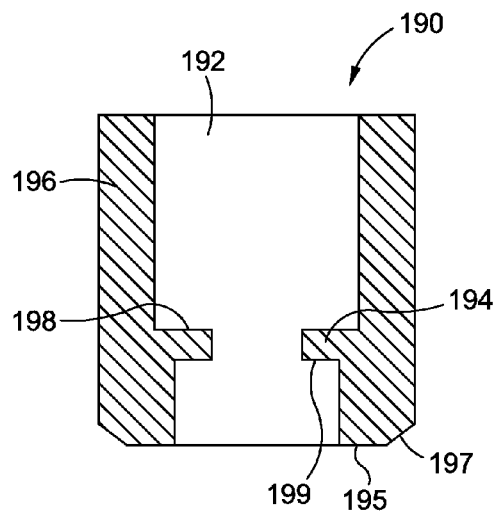
FIG. 3D is a cross-sectional view of the plug sleeve of the shut-off trim shown in FIGS. 2 and 3A-3C.

In addition to the fastener 186, the check valve assembly comprises a generally cylindrical, tubular plug sleeve 190 which is cooperatively engaged to both the fastener 186 and stem 64, and is reciprocally movable relative thereto in a manner which will be described in more detail below. An enlarged, cross-sectional view of the plug sleeve 190 standing alone is shown in FIG. 3D. The plug sleeve 190 includes a bore 192 which extends axially therethrough. The bore 192 is also not of uniform diameter. Rather, the bore defines two (2) different segments or sections, each of which is of differing diameter. More particularly, when viewed from the perspective shown in FIGS. 3A-3D, the bore 192 defines upper and lower sections which are separated from each other by an annular wall portion 194 of the plug sleeve 190 which is integrally connected to a main body portion 196 thereof, and protrudes from the inner surface of the main body portion 196 radially inwardly into the bore 192. The wall portion 194 defines opposed, generally annular first and second shoulders 198, 199, the first shoulder 198 being directed toward the upper section of the bore 192, and the second shoulder 199 being directed toward the lower section of the bore 192 which is of a reduced diameter in comparison to the upper section thereof.

In the check valve assembly of the trim 100, the cooperative engagement of the plug sleeve 190 to the fastener 186 and stem 64 is facilitated by advancing the end portion of the main body portion 196 disposed furthest from the wall portion 194 into the channel 188 of the stem 64. In this regard, the channel 188 has a configuration which is complimentary to that of the end portion of the main body portion 196 which is advanced thereinto. At the same time, the enlarged head portion of the fastener 186 is received into and reciprocally moveable within the reduced diameter lower section of the bore 192. The shank portion of the fastener 186 resides within the increased diameter upper section of the bore 192. The check valve assembly of the trim 100 further includes a biasing spring 178 which also resides within the upper section of the bore 192 of the plug sleeve 190, and extends between the first shoulder 198 and the end surface of the stem 64. The biasing spring 178 normally biases the plug sleeve 190 away from the stem 64, i.e., maximizes the distance separating the wall portion 194 from the end surface of the stem 64. In the check valve assembly, the movement of the plug sleeve 190 away from the stem 64 attributable to the action of the biasing spring 178 is eventually limited by the abutment of the second shoulder 199 defined by the wall portion 194 against the enlarged head portion of the fastener 186. Conversely, the movement of the plug sleeve 190 toward the stem 64 is limited by the eventual abutment or bottoming out of the main body 196 of the plug sleeve 190 against the bottom, innermost surface of the channel 188.

As indicated above, the pilot plug 128 of the trim 100 is movable between a closed position wherein the sealing surface 136 is sealed against the seat ring 24, and an open position wherein the sealing surface 136 is separated from the seat ring 24, thus allowing fluid to flow therebetween into the outflow passage 22. The movement of the pilot plug 128 between its closed and open positions is facilitated by the upward and downward movement or actuation of the stem 64. The reciprocal movement of the stem 64 as is needed to facilitate the movement of the pilot plug 128 between its closed and open positions is facilitated by an actuator which is operatively coupled to that end of the stem 64 opposite that having the fastener 184 attached thereto. The downward movement of the stem 64 when viewed from the perspective shown in FIG. 2 causes a peripheral portion of the end surface thereof having the internally threaded aperture and channel 188 formed therein to act against the shoulder 140 of the pilot plug 128 in a manner which forces the sealing surface 136 of the pilot plug 128 against the seat ring 24 and maintains the sealed engagement therebetween.

When the pilot plug 128 is in its closed position, the biasing force exerted against the plug sleeve 190 by the biasing spring 178 causes an annular sealing surface 197 defined by the main body portion 196 of the plug sleeve 190 to firmly engage and establish sealed contact with a portion of the pilot plug 128 at the inner periphery of the shoulder 142 thereof in the manner shown in FIG. 3A. Further, when the trim 100 is in a state or condition wherein the sealing surface 136 of the pilot plug 128 is sealed against the seat ring 24 and the sealing surface 197 of the plug sleeve 190 is sealed against the pilot plug 128, the pressure level $P_1$ in the inflow passage 20 will typically exceed the pressure level $P_2$ in the outflow passage 22. The pressure level $P_1$ also exists in the plug chamber 14. In this regard, when viewed from the perspective shown in FIG. 2, the plug chamber 14 is at the pressure level $P_1$ both above and below the level of a plug plate 180 which is attached to the top surface 130 of the pilot plug 128 through the use of, for example, fasteners such as bolts 182. The plug plate 180 includes flow openings 184 which are disposed therein and extend between the opposed top and bottom surfaces thereof.

Figure 2:
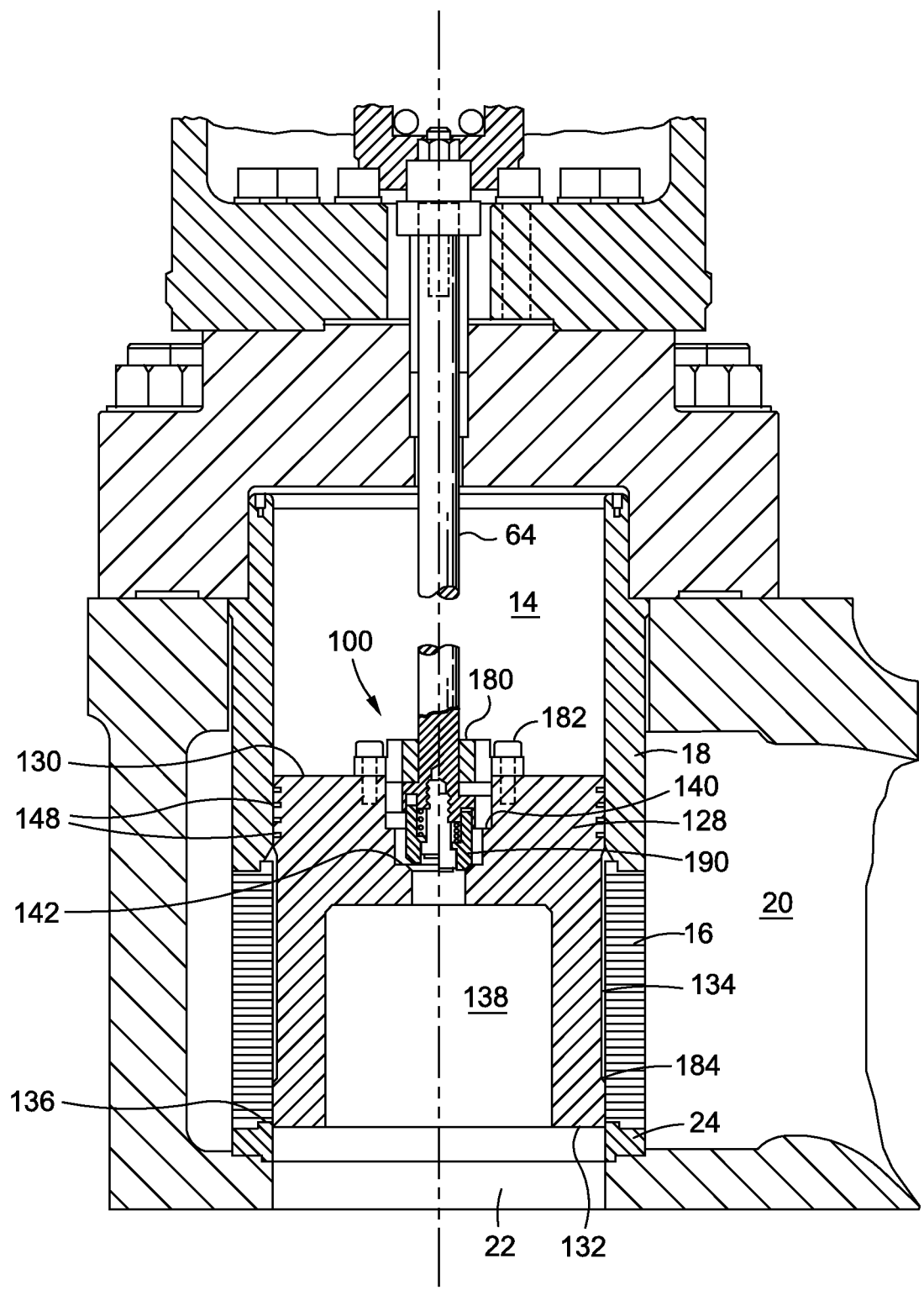
FIG. 2 is a side-elevational, partial cross-sectional view of a shut-off trim constructed in accordance with a second embodiment of the present invention.

In the valve including the trim 100, that portion of the plug chamber 14 located above the top surface 130 of the pilot plug 128 reaches the pressure level $P_1$ as the result of anticipated leakage which occurs between the inner surface of the plug sleeve 18 and the sealing rings 148 disposed in the side surface 134 of the pilot plug 128. In this regard, the sealing rings 148 facilitate the pressurization of that portion of the plug chamber 14 located above the pilot plug 128 in a regulated, metered manner. As seen in FIG. 2, the side surface 134 of the pilot plug 128 is not of uniform outer diameter, but rather defines an annular shoulder 184 which is disposed in relative close proximity to the sealing surface 136. Advantageously, fluid pressure at the pressure level $P_1$ within that portion of the plug chamber 14 below the top surface 130 and in between the side surface 134 and the inner surfaces of the disc stack 16 and plug sleeve 18 is able to act against the shoulder 184 in a manner supplementing or increasing the force of the sealed engagement between the sealing surface 136 and seat ring 24. Such sealed engagement is further supplemented by the pressure level $P_1$ within that portion of the plug chamber 14 disposed above the pilot plug 128 acting against the top surface 130 thereof. The pressure level $P_1$ also acts against the shoulders 140, 142 within the bore 138 of the pilot plug 128, thus further supplementing the force of the sealed engagement to be between the sealing surface 136 and the seat ring 24. In this regard, fluid migrating between the pilot plug 128 and plug sleeve 18 into that portion of the plug chamber 14 disposed above the pilot plug 128 is able to flow into the uppermost and upper middle sections of the bore 138 to act against the shoulders 140, 142 via the flow openings 184 of the plug plate 180 and one or more additional flow openings 185 which are disposed in the peripheral portion of the enlarged end portion of the stem 64 having the internally threaded aperture and the channel 188 formed therein. Even if the end surface of the stem 64 is firmly seated against the shoulder 140 of the pilot plug 128, fluid is able to flow into the upper middle section of the bore 138 via the flow openings 185. Such flow results in the uppermost and upper middle sections of the bore 138 reaching the fluid pressure level $P_1$.

Moreover, in the valve including the trim 100, the movement of the pilot plug 128 from its closed position to its open position is facilitated by the upward movement of the stem 64, such upward movement being facilitated by the actuator cooperatively engaged to the stem 64. The upward movement of the stem 64 initially causes the head portion of the fastener 186 to act against the shoulder 199 defined by the wall portion 194 of the plug sleeve 190 in a manner which effectively removes the sealing surface 197 of the plug sleeve 190 from its sealed engagement to the pilot plug 128. The movement of the plug sleeve 190 out of sealed engagement with the pilot plug 128 creates a balanced pressure condition between the plug chamber 14 and outflow passage 22. In this regard, the removal of the plug sleeve 190 from its sealed engagement to the pilot plug 128 allows for open flow between the plug chamber 14 and the outflow passage 22 via the bore 138, the flow passages 184 of the plug plate 180, and the flow passages 185 within the enlarged end portion of the stem 64.

The continued upward movement of the stem 64 after the plug sleeve 190 is unseated from the pilot plug 128 results in the enlarged end portion of the stem 64 acting against the bottom surface of the plug plate 180. By virtue of the attachment of the plug plate 180 to the pilot plug 128, the continued upward movement of the stem 64 after the same engages the plug plate 180 results in the sealing surface 136 of the pilot plug 128 being lifted off of and thus separated from the seat ring 24, thereby causing the trim 100 to assume an open position.

In the trim 100, it is contemplated that in a further mode of operation, a balanced pressure condition between the plug chamber 14 and the outflow passage 22 may be achieved if the pilot plug 128 is in its closed position, but the pressure level $P_2$ in the outflow passage 22 exceeds the pressure level $P_1$ in the inflow passage 20 and plug chamber 14. In this instance, it is contemplated that the pressure level $P_2$ will act against an annular end surface 195 of the plug sleeve 190 which is defined by the main body portion 196 thereof. In this regard, the sealing surface 197 extends to the outer peripheral edge of the end surface 195. More particularly, the pressure level $P_2$ reaches the end surface 195 via the lowermost and lower middle sections of the bore 138, and acts against the end surface 195 in a manner facilitating the compression of the biasing spring 178 and removal of the sealing surface 197 from its sealed engagement to the pilot plug 128. The upward movement of the plug sleeve 190 by virtue of the compression of the biasing spring 178 is accommodated by the clearance between that end surface of the main body portion 196 opposite the end surface 195 and the bottom of the channel 188. Once the plug sleeve 190 is unseated from the pilot plug 128, fluid is able to flow from the outflow passage 22 into that portion of the plug chamber 14 above the pilot plug 128 via the bore 138 and the flow passages 185, 184. The equalization of the pressure level in the plug chamber 14 with the pressure level in the outflow passage 22 results in the sealing surface 197 of the plug sleeve 190 being returned to sealed engagement to the pilot plug 128 by operation of the biasing spring 178. The check valve assembly integrated to the trim 100 provides the same functional characteristics of the trim 10 described above.

Referring now to FIGS. 4A-4C, there is shown in different states of actuation a check valve assembly 200 which may be integrated into a shut-off trim constructed in accordance with a third embodiment of the present invention, the check valve assembly 200 shown in FIGS. 4A-4C being used as an alternative to the check valve assembly shown in FIGS. 3A-3D. In this regard, the check valve assembly 200 is used in conjunction with the same pilot plug 128 possessing the same structural and functional attributes as described above in relation to the trim 100. The check valve assembly 200 is also used in conjunction with the aforementioned plug plate 180 which is attached to the pilot plug 128 in the same manner described above in relation to the trim 100.

The check valve assembly 200 integrated to the trim constructed in accordance with the third embodiment of the present invention comprises an auxiliary plug 286 which is secured to that end of the stem 64 opposite the end portion cooperatively engaged to the actuator. The auxiliary plug 286 comprises a cylindrically configured main body portion 287 having an elongate stem portion 289 protruding therefrom. Disposed within and extending through the stem portion 289 is an elongate slot 291. Additionally, disposed in the main body portion 287 is an annular channel 293 of a prescribed depth, the channel 293 circumventing the base of the stem portion 289. The auxiliary plug 286 further defines an annular plan flange portion 295 which circumvents the channel 293, and thus also circumvents the base of the stem portion 289.

In the check valve assembly 200, the stem portion 289 of the auxiliary plug 286 is slideably advanced into a complimentary aperture disposed within the end surface of the enlarged end portion of the stem 64. Subsequent to the advancement of the stem portion 289 into the complimentary aperture within the stem 64, a pin 297 is advanced through the stem 64 and through the slot 291 disposed within the stem portion 289. As seen in FIGS. 4A-4C, the advancement of the pin 297 through the slot 291 allows for the reciprocal movement of the auxiliary plug 286 toward and away from the stem 64, but maintains the auxiliary plug 286 in attachment to the stem 64.

As is apparent from FIGS. 4A-4C and as indicated above, the end portion of the stem 64 defining the end surface having the aperture formed therein is enlarged relative to the remainder of the stem 64. The end surface of the stem 64 which includes such aperture for receiving the stem portion 289 also includes an annular groove or channel 288 which is formed therein and circumvents the aforementioned aperture. The use of the channel 288 will be described in more detail below.

In the check valve assembly 200, the cooperative engagement of the auxiliary plug 286 to the stem 64 is facilitated the advancing the stem portion 289 into the complimentary aperture in the end surface defined by the enlarged end portion of the stem 64, and securing the auxiliary plug 286 to the stem 64 through the use of the pin 297 advanced through the slot 291 within the stem portion 289. At the same time, the flange portion 295 of the auxiliary plug 286 is slidably advanced into the channel 288 which has a configuration complimentary to that of the flange portion 295. As is also apparent from FIGS. 4A-4C, the check valve assembly 200 further includes a biasing spring 278 which is disposed within the channel 293, and extends between the main body portion 287 of the auxiliary plug 286 and a portion of the end surface of the enlarged end portion of the stem 64 which circumvents the aperture therein for accommodating the stem portion 289. The biasing spring 278 normally biases the auxiliary plug 286 away from the stem 64. In the check valve assembly 200, the movement of the auxiliary plug 286 away from the stem 64 attributable to the action of the biasing spring 278 is eventually limited by the abutment of the pin 297 against that end of the slot 291 disposed closest to the distal end of the stem portion 289. Conversely, the movement of the auxiliary plug 286 toward the stem 64 is limited by the abutment of the pin 297 against the opposite end slot 291 and/or the abutment or bottoming out of the flange portion 295 of the auxiliary plug 286 against the bottom of the channel 288 within the enlarged end portion of the stem 264.

The pilot plug 128 of the trim including the check valve assembly 200 is movable between a closed position wherein the sealing surface 136 is sealed against the seat ring 24, and an open position wherein the sealing surface 136 is separated from the seat ring 24, thus allowing fluid to flow therebetween into the outflow passage 22. The movement of the pilot plug 128 between its closed and open positions is facilitated by the upward and downward movement or actuation of the stem 64. As in the prior embodiments discussed above, the reciprocal movement of the stem 64 as is needed to facilitate the movement of the pilot plug 128 between its closed and open positions is facilitated by an actuator which is operatively coupled to that end of the stem 64 opposite that having the auxiliary plug 286 attached thereto. The downward movement of the stem 64 when viewed from the perspective shown in FIGS. 4A-4C causes a peripheral portion of the end surface thereof having the aperture and channel 288 formed therein to act against the shoulder 140 of the pilot plug 128 in a manner which forces the sealing surface 136 of the pilot plug 128 against the seat ring 24 and maintains the sealed engagement therebetween.

When the pilot plug 128 is in its closed position, the biasing force exerted against the auxiliary plug 286 by the biasing spring 278 causes an annular sealing surface 299 defined by the main body portion 287 of the auxiliary plug 286 to firmly engage and establish sealed contact with a portion of the pilot plug 128 at the inner periphery of the shoulder 142 thereof in the manner shown in FIG. 4A. Further, when the trim including the check valve assembly 200 is in a state or condition wherein the sealing surface 136 of the pilot plug 128 is sealed against the seat ring 24 and the sealing surface 299 of the auxiliary plug 286 is sealed against the pilot plug 128, the pressure level $P_1$ in the inflow passage 20 will typically exceed the pressure level $P_2$ in the outflow passage 22. The pressure level $P_1$ also exists in the plug chamber 14. In this regard, when viewed from the perspective shown in FIGS. 4A-4C, the plug chamber 14 is at the pressure level $P_1$ both above and below the level of a plug plate 180 which is attached to the top surface 130 of the pilot plug 128 through the use of the bolts 182. As indicated above, the plug plate 180 includes flow openings 184 which are disposed therein and extend between the opposed top and bottom surfaces thereof.

In the valve including the trim having the check valve assembly 200, that portion of the plug chamber 14 located above the top surface 130 of the pilot plug 128 reaches the pressure level $P_1$ as the result of anticipated leakage which occurs between the inner surface of the plug sleeve 18 and the sealing rings 148 disposed in the side surface 134 of the pilot plug 128. In this regard, the sealing rings 148 facilitate the pressurization of that portion of the plug chamber 14 located above the pilot plug 128 in a regulated, metered manner. As indicated above, the side surface 134 of the pilot plug 128 is not of uniform outer diameter, but rather defines an annular shoulder 184 which is disposed in relative close proximity to the sealing surface 136. Advantageously, fluid pressure at the pressure level $P_1$ within that portion of the plug chamber 14 below the top surface 130 and in between the side surface 134 and the inner surfaces of the disc stack 16 and plug sleeve 18 is able to act against the shoulder 184 in a manner supplementing or increasing the force of the sealed engagement between the sealing surface 136 and seat ring 24. Such sealed engagement is further supplemented by the pressure level $P_1$ within that portion of the plug chamber 14 disposed above the pilot plug 128 acting against the top surface 130 thereof. The pressure level $P_1$ also acts against the shoulders 140, 142 within the bore 138 of the pilot plug 128, thus further supplementing the force of the sealed engagement to be between the sealing surface 136 and the seat ring 24. In this regard, fluid migrating between the pilot plug 128 and plug sleeve 18 into that portion of the plug chamber 14 disposed above the pilot plug 128 is able to flow into the uppermost and upper middle sections of the bore 138 to act against the shoulders 140, 142 via the flow openings 184 of the plug plate 180 and one or more additional flow openings 285 which are disposed in the peripheral portion of the enlarged end portion of the stem 64 having the aperture and the channel 288 formed therein. Even if a portion of the end surface of the stem 64 is firmly seated against the shoulder 140 of the pilot plug 128, fluid is able to flow into the upper middle section of the bore 138 via the flow openings 285. Such flow results in the uppermost and upper middle sections of the bore 138 reaching the fluid pressure level $P_1$.

Moreover, in the valve including the trim having the check valve assembly 200, the movement of the pilot plug 128 from its closed position to its open position is facilitated by the upward movement of the stem 64, such upward movement being facilitated by the actuator cooperatively engaged to the stem 64. The upward movement of the stem 64 initially causes the pin 297 to act against the stem portion 289 of the auxiliary plug 286 in a manner which effectively removes the sealing surface 299 of the auxiliary plug 286 from its sealed engagement to the pilot plug 128. The movement of the auxiliary plug 286 out of sealed engagement with the pilot plug 128 creates a balanced pressure condition between the plug chamber 14 and outflow passage 22. In this regard, the removal of the auxiliary plug 286 from its sealed engagement to the pilot plug 128 allows for open flow between the plug chamber 14 and the outflow passage 22 via the bore 138, the flow passages 184 of the plug plate 180, and the flow passages 285 within the enlarged end portion of the stem 64.

The continued upward movement of the stem 64 after the auxiliary plug 286 is unseated from the pilot plug 128 results in the enlarged end portion of the stem 64 acting against the bottom surface of the plug plate 180. By virtue of the attachment of the plug plate 180 to the pilot plug 128, the continued upward movement of the stem 64 after the same engages the plug plate 180 results in the sealing surface 136 of the pilot plug 128 being lifted off of and thus separated from the seat ring 24, thereby causing the trim including the check valve assembly 200 to assume an open position.

In the trim of the third embodiment including the check valve assembly 200, it is contemplated that in a further mode of operation, a balanced pressure condition between the plug chamber 14 and the outflow passage 22 may be achieved if the pilot plug 128 is in its closed position, but the pressure level $P_2$ in the outflow passage 22 exceeds the pressure level $P_1$ in the inflow passage 20 and plug chamber 14. In this instance, it is contemplated that the pressure level $P_2$ will act against a circular end surface 283 of the auxiliary plug 286 which is defined by the main body portion 287 thereof. In this regard, the sealing surface 299 extends to the outer peripheral edge of the end surface 283. More particularly, the pressure level $P_2$ reaches the end surface 283 via the lowermost and lower middle sections of the bore 138, and acts against the end surface 283 in a manner facilitating the compression of the biasing spring 278 and removal of the sealing surface 299 from its sealed engagement to the pilot plug 128. The upward movement of the auxiliary plug 286 by virtue of the compression of the biasing spring 278 is accommodated by the clearance between the flange portion 295 and the bottom of the channel 288. Once the auxiliary plug 286 is unseated from the pilot plug 128, fluid is able to flow from the outflow passage 22 into that portion of the plug chamber 14 above the pilot plug 128 via the bore 138 and the flow passages 285, 184. The equalization of the pressure level in the plug chamber 14 with the pressure level in the outflow passage 22 results in the sealing surface 299 of the auxiliary plug 286 being returned to sealed engagement to the pilot plug 128 by operation of the biasing spring 278. The check valve assembly 200 provides the same functional characteristics of the trim 10 described above.

Figure 5:
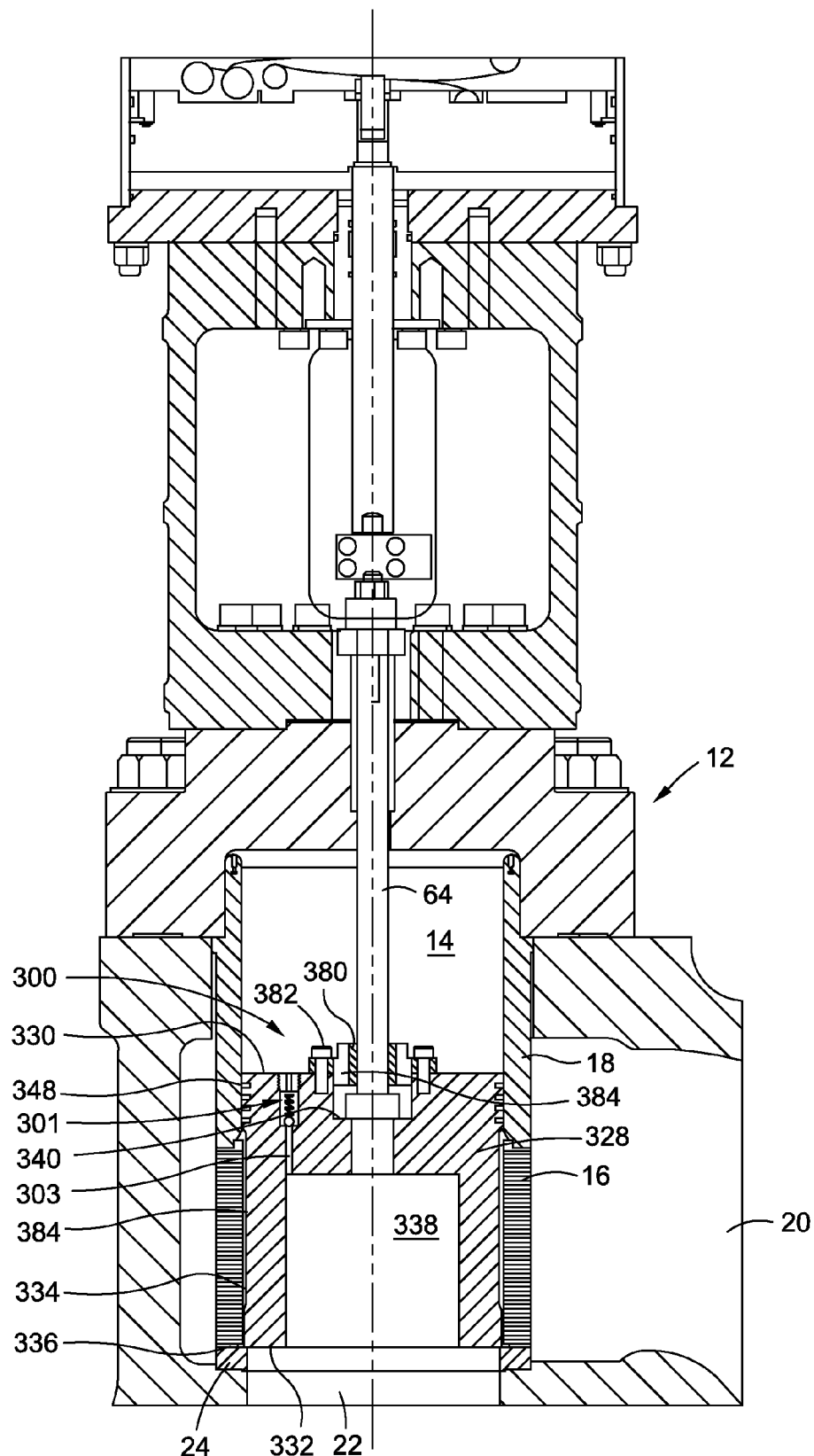
FIG. 5 is a side-elevational, partial cross-sectional view of a shut-off trim constructed in accordance with a fourth embodiment of the present invention.
Figure 6A:
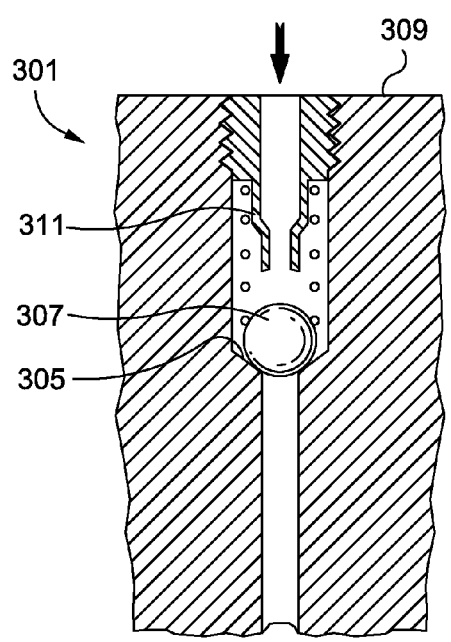
FIGS. 6A-6B are side-elevational views illustrating the check valve of the shut-off trim shown in FIG. 5 in differing states of actuation.
Figure 6B:
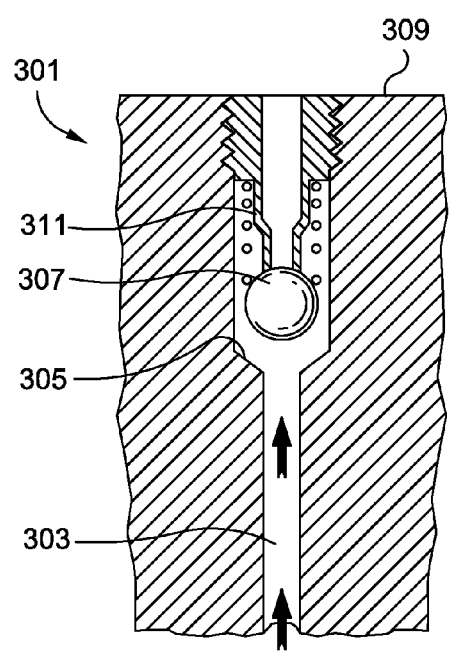

Referring now to FIGS. 5 and 6A-6B, there is shown a shut-off trim 300 constructed in accordance with a fourth embodiment of the present invention. The trim 300 comprises a pilot plug 328 which, from the perspective shown in FIG. 5, defines a top surface 330, a bottom surface 332, a side surface 334, and a sealing surface 336 which extends between the bottom and side surfaces 332, 334. The pilot plug 328 is not solid, but rather has a bore 338 extending axially therethrough. The bore 338 is not of uniform diameter. Rather, the bore 338 defines three (3) different segments or sections, each of which is of a differing diameter. More particularly, the bore 338 includes an upper section and a middle section which is of a reduced diameter in comparison to the upper section. The bore 338 also defines a lower section which is of the greatest diameter, exceeding that of the upper section thereof. The upper and middle sections of the bore 338 are separated by a shoulder 340. Disposed in the side surface 334 of that portion of the pilot plug 328 which defines the upper bore section is a plurality of sealing rings 348 which circumvent the pilot plug 328 and are used for reasons which will also be described in more detail below.

When the trim 300 is in a closed position within the exemplary valve including the same, the sealing surface 336 defined by the pilot plug 328 is firmly seated and sealed against the seat ring 24. The trim 300 assumes an open position when, from the perspective shown in FIG. 2, the pilot plug 328 is caused to move upwardly as results in the sealing surface 336 thereof effectively being separated from the seat ring 24. Such separation allows fluid from within the plug chamber 14 to flow between the sealing surface 336 and seat ring 24 into outflow passage 22.

The pilot plug 328 included in the trim 300 further includes a check valve assembly 301 which is shown with particularity in FIGS. 6A and 6B. More particularly, the check valve assembly 301 comprises a flow passage 303 which extends from the top surface 330 of the pilot plug 328 to and into fluid communication with the lower section of the bore 338 thereof in the manner best shown in FIG. 5. The flow passage 303 is not of uniform inner diameter. Rather, when viewed from the perspective shown in FIG. 5, the flow passage 303 includes an upper section and a lower section which are separated from each other by an annular shoulder 305, the diameter of the upper section exceeding that of the lower section. Disposed within the upper section of the flow passage 303 is a check ball 307. The diameter of the check ball 307 presents the same from entering into the lower section of the flow passage 303. The check ball 307 is maintained within the upper section of the flow passage 303 by an annular cap 309 which is partially advanced into the upper section of the flow passage 303, and extends in substantially flush relation to the top surface 330 of the pilot plug 328. At least a portion of that surface of the pilot plug 328 defining the upper section of the flow passage 303 is internally threaded, with the outer surface of the cap 309 being externally threaded so as to provide for the threadable engagement of the cap 309 to the plug 328.

The check valve assembly 301 further comprises a biasing spring 311 which is disposed within the upper section of the flow passage 303. One end of the biasing spring 311 is abutted against or engaged to the check ball 307, with the opposite end of the biasing spring 311 being abutted against that end surface of the cap 309 which is opposite the end surface extended in substantially flush relation to the top surface 330 of the pilot plug 328. As seen in FIG. 6A, the biasing spring 311 normally biases the check ball 307 against the inner peripheral edge of the shoulder 305, thus causing the check ball 307 to define a blockage or seal between the upper and lower sections of the flow passage 303. By virtue of its annular configuration, the cap 309 defines a flow opening which extends axially therethrough and facilitates the fluid communication between the flow passage 303 and that portion of the plug chamber 14 disposed above the pilot plug 328 when viewed from the perspective shown in FIG. 5.

The pilot plug 328 of the trim 300 is movable between a closed position wherein the sealing surface 336 is sealed against the seat ring 24, and an open position wherein the sealing surface 336 is separated from the seat ring 24, thus allowing fluid to flow therebetween into the outflow passage 22. The movement of the pilot plug 328 between its closed and open positions is facilitated by the upward and downward movement or actuation of the stem 64. As in the prior embodiments discussed above, the reciprocal movement of the stem 64 as is needed to facilitate the movement of the pilot plug 328 between its closed and open positions is facilitated by an actuator which is operatively coupled thereto. The downward movement of the stem 64 when viewed from the perspective shown in FIG. 5 causes a peripheral portion of the end surface thereof to act against the shoulder 340 of the pilot plug 328 in a manner which forces the sealing surface 336 of the pilot plug 328 against the seat ring 24 and maintains the sealed engagement therebetween.

When the pilot plug 328 is in its closed position, the biasing force exerted against the check ball 307 by the biasing spring 311 causes the check ball 307 to be firmly seated and sealed against the shoulder 305, thus effectively blocking fluid communication between the outflow passage 22 and plug chamber 14 as would otherwise be provided by the flow passage 303. Further, when the trim 300 is in a state or condition wherein the sealing surface 336 of the pilot plug 328 is sealed against the seat ring 24 and the check ball 307 is sealed against the shoulder 305, the pressure level $P_1$ in the inflow passage 20 will typically exceed the pressure level $P_2$ in the outflow passage 22. The pressure level $P_1$ also exists in the plug chamber 14. In this regard, when viewed from the perspective shown in FIG. 5, the plug chamber 14 is at the pressure level $P_1$ both above and below the level of a plug plate 380 which is attached to the top surface 330 of the pilot plug 328 through the use the bolts 382. The plug plate 380 includes flow openings 384 which are disposed therein and extend between the opposed top and bottom surfaces thereof.

In the valve including the trim 300, that portion of the plug chamber 14 located above the top surface 330 of the pilot plug 328 reaches the pressure level $P_1$ as the result of anticipated leakage which occurs between the inner surface of the plug sleeve 18 and the sealing rings 348 disposed in the side surface 334 of the pilot plug 328. In this regard, the sealing rings 348 facilitate the pressurization of that portion of the plug chamber 14 located above the pilot plug 328 in a regulated, metered manner. The side surface 334 of the pilot plug 328 is not of uniform outer diameter, but rather defines an annular shoulder 384 which is disposed in relative close proximity to the sealing surface 336. Advantageously, fluid pressure at the pressure level $P_1$ within that portion of the plug chamber 14 below the top surface 330 and in between the side surface 334 and the inner surfaces of the disc stack 16 and plug sleeve 18 is able to act against the shoulder 384 in a manner supplementing or increasing the force of the sealed engagement between the sealing surface 336 and seat ring 24. Such sealed engagement is further supplemented by the pressure level $P_1$ within that portion of the plug chamber 14 disposed above the pilot plug 328 acting against the top surface 330 thereof. The pressure level $P_1$ also acts against the shoulder 340 within the bore 338 of the pilot plug 328, thus further supplementing the force of the sealed engagement to be between the sealing surface 336 and the seat ring 24. In this regard, fluid migrating between the pilot plug 128 and plug sleeve 18 into that portion of the plug chamber 14 disposed above the pilot plug 328 is able to flow into the upper section of the bore 338 to act against the shoulders 140 via the flow openings 384 of the plug plate 380. Such flow results in the upper section of the bore 338 reaching the fluid pressure level $P_1$. Fluid at the pressure level $P_1$ also flows from the plug chamber 14 into the upper section of the flow passage 303 via the flow opening defined by the cap 309. Such fluid at the pressure level $P_1$ acts against the check ball 307 in a manner supplementing the biasing force exerted thereagainst by the biasing spring 311, thus enhancing the sealed engagement of the check ball 307 against the shoulder 305.

Moreover, in the valve including the trim 300 having the check valve assembly 301, the movement of the pilot plug 328 from its closed position to its open position is facilitated by the upward movement of the stem 64, such upward movement being facilitated by the actuator cooperatively engaged to the stem 64. When the pilot plug 328 is in its closed position, a sealing surface defined by the enlarged end portion of the stem 64 engages and is sealed against the inner peripheral rim defined by the shoulder 340 of the pilot plug 328, thus effectively creating a blockage or barrier between the upper and middle sections of the bore 338. The upward movement of the stem 64 initially causes the sealing surface of the stem 64 to be removed from its sealed engagement to the pilot plug 328, thus creating a balanced pressure condition between the plug chamber 14 and outflow passage 22. In this regard, the removal of the sealing surface defined by the enlarged end portion of the stem 64 from its sealed engagement to the pilot plug 328 allows for open flow between the plug chamber 14 and the outflow passage 22 via the bore 338 and flow passages 384 of the plug plate 380.

The continued upward movement of the stem 64 after the sealing surface thereof is unseated from the pilot plug 328 results in the enlarged end portion of the stem 64 acting against the bottom surface of the plug plate 380. By virtue of the attachment of the plug plate 380 to the pilot plug 328, the continued upward movement of the stem 64 after the same engages the plug plate 380 results in the sealing surface 336 of the pilot plug 328 being lifted off of and thus separated from the seat ring 24, thereby causing the trim 300 to assume an open position.

In the trim 300 including the check valve assembly 301, it is contemplated that in a further mode of operation, a balanced pressure condition between the plug chamber 14 and the outflow passage 22 may be achieved if the pilot plug 328 is in its closed position, but the pressure level $P_2$ in the outflow passage 22 exceeds the pressure level $P_1$ in the inflow passage 20 and plug chamber 14. In this instance, it is contemplated that the pressure level $P_2$ will act against the check ball 307 in a manner overcoming the biasing force exerted thereagainst by the biasing spring 311, thus effectively forcing the check ball 307 toward the cap 309 and out of its sealed engagement to the shoulder 305. As will be recognized, since the diameter of the check ball 307 is less than that of the upper section of the flow passage 303, the movement of the check ball 307 out of sealed engagement to the shoulder 305 effectively unblocks the flow passage 303, thus allowing open fluid communication between the outflow passage 22 and that portion of the plug chamber 14 disposed above the pilot plug 328. As will be recognized, the pressure level $P_2$ reaches the check ball 307 via the lower section of the bore 338 and the lower section of the flow passage 303. As indicated above, once the check ball 307 is unseated from the shoulder 305, fluid is able to flow from out outflow passage 22 into that portion of the plug chamber 14 above the pilot plug 328 via the lower section of the bore 338 and flow passage 303. The equalization of the pressure level in the plug chamber 14 with the pressure level in the outflow passage 22 results in the check ball 307 of the check valve assembly 301 being returned to sealed engagement to the shoulder 305 by operation of the biasing spring 311. The trim 300 including the check valve assembly 301 provides the same functional characteristics of the trim 10 described above.

This disclosure provides exemplary embodiments of the present invention only. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A valve for regulating the flow of a fluid, the valve comprising:
    a housing which includes an interior plug chamber, inflow and outflow passages which fluidly communicate with the plug chamber, and a seating surface disposed between the plug chamber and the outflow passage;
    a reciprocally movable valve stem which extends into the plug chamber; and
    a shut-off trim disposed within the plug chamber between the inflow and outflow passages, the shut-off trim comprising:
        a main pilot plug having a bore extending axially therethrough, the main pilot plug defining a main sealing surface, and a plug seating surface which is disposed within the bore thereof; and
        a check valve assembly disposed within the bore of the main pilot plug and comprising:
            an auxiliary plug which is disposed within the bore of the main pilot plug and movably attached to the stem by a pin which is movable concurrently with the stem, the auxiliary plug defining an auxiliary sealing surface; and
            a biasing spring which is disposed within the bore of the main pilot plug and extends between the stem and the auxiliary plug;
        the shut-off trim being reciprocally movable between a closed position wherein the main sealing surface of the main pilot plug is sealed against the seating surface of the housing and the auxiliary sealing surface of the auxiliary plug is sealed against the plug seating surface of the main pilot plug, and an open position wherein the main sealing surface of the main pilot plug is separated from the seating surface of the housing and the auxiliary sealing surface of the auxiliary plug is separated from the plug seating surface of the main pilot plug, the shut-off trim being configured such that the separation of the auxiliary sealing surface of the auxiliary plug from the plug seating surface occurs prior to the separation of the main sealing surface from the seating surface as the shut off trim moves from the closed position toward the open position, the biasing spring being operative to bias the auxiliary sealing surface of the auxiliary plug against the plug seating surface of the main pilot plug when the shut-off trim is in the closed position;
        the auxiliary plug being sized and configured relative to the main pilot plug and the stein such that:
            the movement of the stein in a first direction when the shut-off trim is in the closed position causes the pin to initially act against the auxiliary plug in a manner facilitating the separation of the auxiliary sealing surface thereof from the plug seating surface, the stein thereafter acting against the main pilot plug in a manner facilitating the separation of the main sealing surface thereof from the seating surface; and
            the movement of the stein in a second direction opposite the first direction when the shut-off trim is in the open position causes the stein to act against the main pilot plug in a manner facilitating the sealed engagement between the main sealing surface thereof and the seating surface.

2. The valve of claim 1 wherein the shut-off trim further comprises a plug plate attached to the main pilot plug, the stem acting against the plug plate to facilitate the separation of the main sealing surface of the main pilot plug from the seating surface upon the movement of the stem in the first direction when the shut-off trim is in the closed position.

3. The valve of claim 2 wherein the plug plate includes at least one flow opening disposed therein which facilitates the fluid communication between the plug chamber and the bore of the main pilot plug.

4. A valve for regulating the flow of a fluid, the valve comprising:
    a housing which includes an interior plug chamber, inflow and outflow passages which fluidly communicate with the plug chamber, and a seating surface disposed between the plug chamber and the outflow passage;
    a reciprocally movable valve stem which extends into the plug chamber; and a shut-off trim disposed within the plug chamber between the inflow and outflow passages, the shut-off trim comprising:
- a main pilot plug having a bore extending axially therethrough, the main pilot plug defining a main sealing surface, and a plug seating surface which is disposed within the bore thereof;
- a plug plate attached to the main pilot plug; and
- a check valve assembly disposed within the bore of the main pilot plug and comprising an auxiliary plug which is disposed within the bore of the main pilot plug and movably attached to the stem by a pin which is movable concurrently with the stem, the auxiliary plug defining an auxiliary sealing surface;

the shut-off trim being reciprocally movable between a closed position wherein the main sealing surface of the main pilot plug is sealed against the seating surface of the housing and the auxiliary sealing surface of the auxiliary plug is sealed against the plug seating surface of the main pilot plug, and an open position wherein the main sealing surface of the main pilot plug is separated from the seating surface of the housing and the auxiliary sealing surface of the auxiliary plug is separated from the plug seating surface of the main pilot plug, the shut-off trim being configured such that the separation of the auxiliary sealing surface of the auxiliary plug from the plug seating surface occurs prior to the separation of the main sealing surface from the seating surface as the shut off trim moves from the closed position toward the open position;

the auxiliary plug being sized and configured relative to the main pilot plug and the stem such that:
- the movement of the stem in a first direction when the shut-off trim is in the closed position causes the pin to initially act against the auxiliary plug in a manner facilitating the separation of the auxiliary sealing surface thereof from the plug seating surface, the stein thereafter acting against the main pilot plug in a manner facilitating the separation of the main sealing surface thereof from the seating surface; and
- the movement of the stein in a second direction opposite the first direction when the shut-off trim is in the open position causes the stein to act against the main pilot plug in a manner facilitating the sealed engagement between the main sealing surface thereof and the seating surface;
- the stein acting against the plug plate to facilitate the separation of the main sealing surface of the main pilot plug from the seating surface upon the movement of the stein in the first direction when the shut-off trim is in the closed position.

5. The valve of claim 4 wherein the check valve assembly further comprises a biasing spring which is disposed within the bore of the main pilot plug and extends between the stem and the auxiliary plug, the biasing spring being operative to bias the auxiliary sealing surface of the auxiliary plug against the plug seating surface of the main pilot plug when the shut-off trim is in the closed position.

6. The valve of claim 4 wherein the plug plate includes at least one flow opening disposed therein which facilitates the fluid communication between the plug chamber and the bore of the main pilot plug.

7. A valve for regulating the flow of a fluid, the valve comprising:
- a housing which includes an interior plug chamber, inflow and outflow passages which fluidly communicate with the plug chamber, and a seating surface disposed between the plug chamber and the outflow passage;
- a reciprocally movable valve stem which extends into the plug chamber; and
- a shut-off trim disposed within the plug chamber between the inflow and outflow passages, the shut-off trim comprising:
  - a main pilot plug having a bore extending axially therethrough, the main pilot plug defining a main sealing surface, and a plug seating surface which is disposed within the bore thereof; and
  - a check valve assembly disposed within the bore of the main pilot plug and comprising:
    - an auxiliary plug which is disposed within the bore of the main pilot plug and movably attached to the stem by a pin which is movable concurrently with the stem, the auxiliary plug defining an auxiliary sealing surface; and
    - a biasing spring which is disposed within the bore of the main pilot plug and extends between the stem and the auxiliary plug;

the shut-off trim being reciprocally movable between a closed position wherein the main sealing surface of the main pilot plug is sealed against the seating surface of the housing and the auxiliary sealing surface of the auxiliary plug is sealed against the plug seating surface of the main pilot plug, and an open position wherein the main sealing surface of the main pilot plug is separated from the seating surface of the housing and the auxiliary sealing surface of the auxiliary plug is separated from the plug seating surface of the main pilot plug, the biasing spring being operative to bias the auxiliary sealing surface of the auxiliary plug against the plug seating surface of the main pilot plug when the shut-off trim is in the closed position.

8. The valve of claim 7 wherein the shut-off trim is configured such that the separation of the auxiliary sealing surface of the auxiliary plug from the plug seating surface occurs prior to the separation of the main sealing surface from the seating surface as the shut off trim moves from the closed position toward the open position.

* * * * *